INVENTOR.
BYRON B. BROOKHYSER

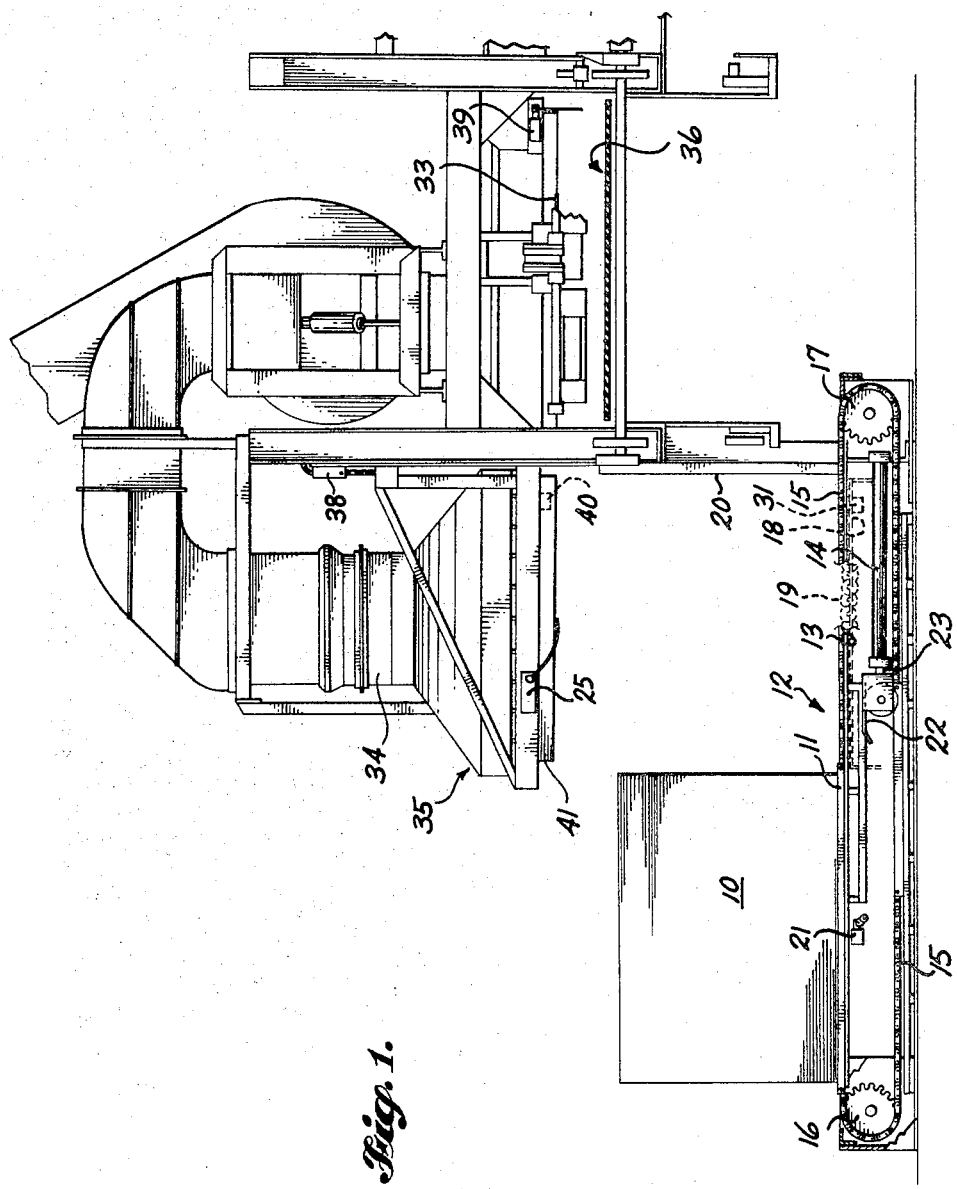

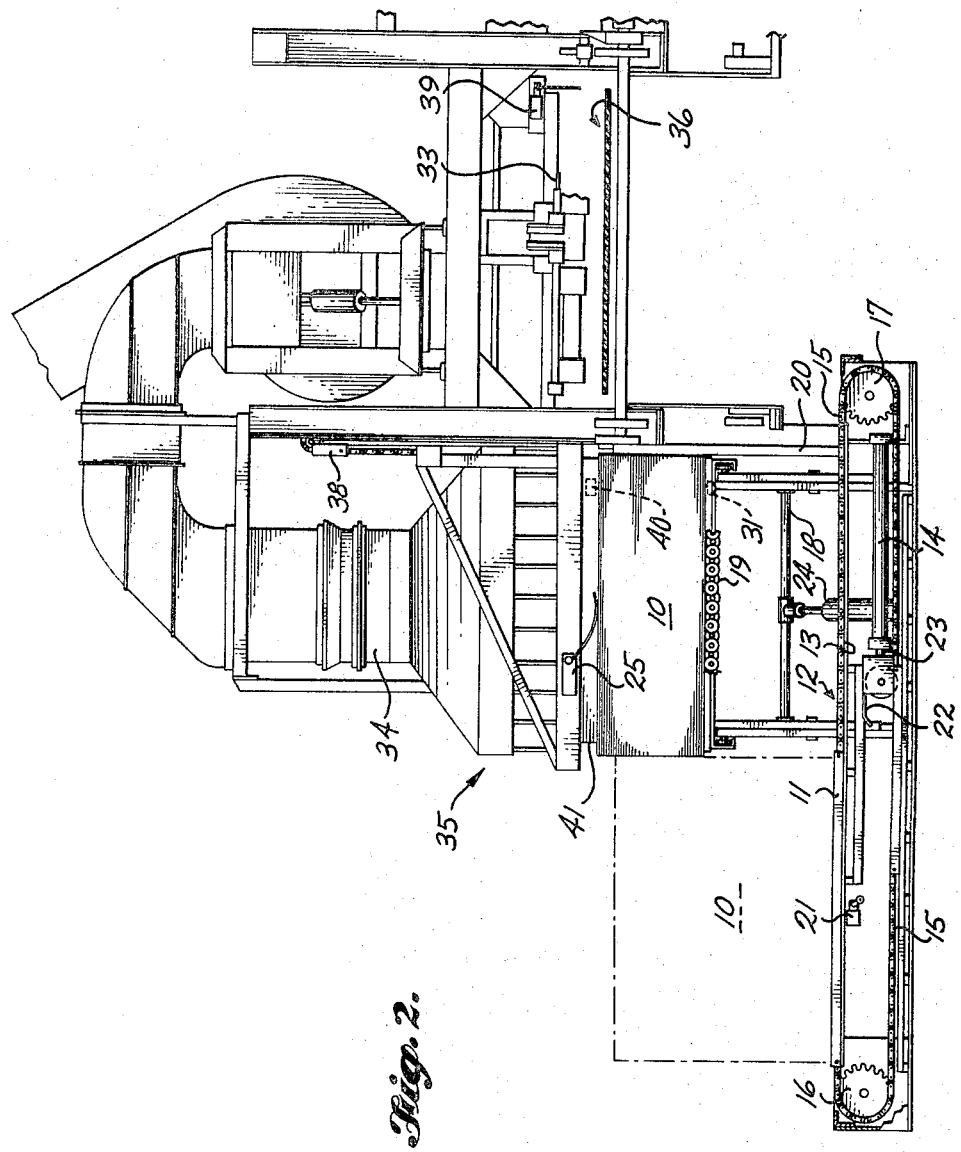

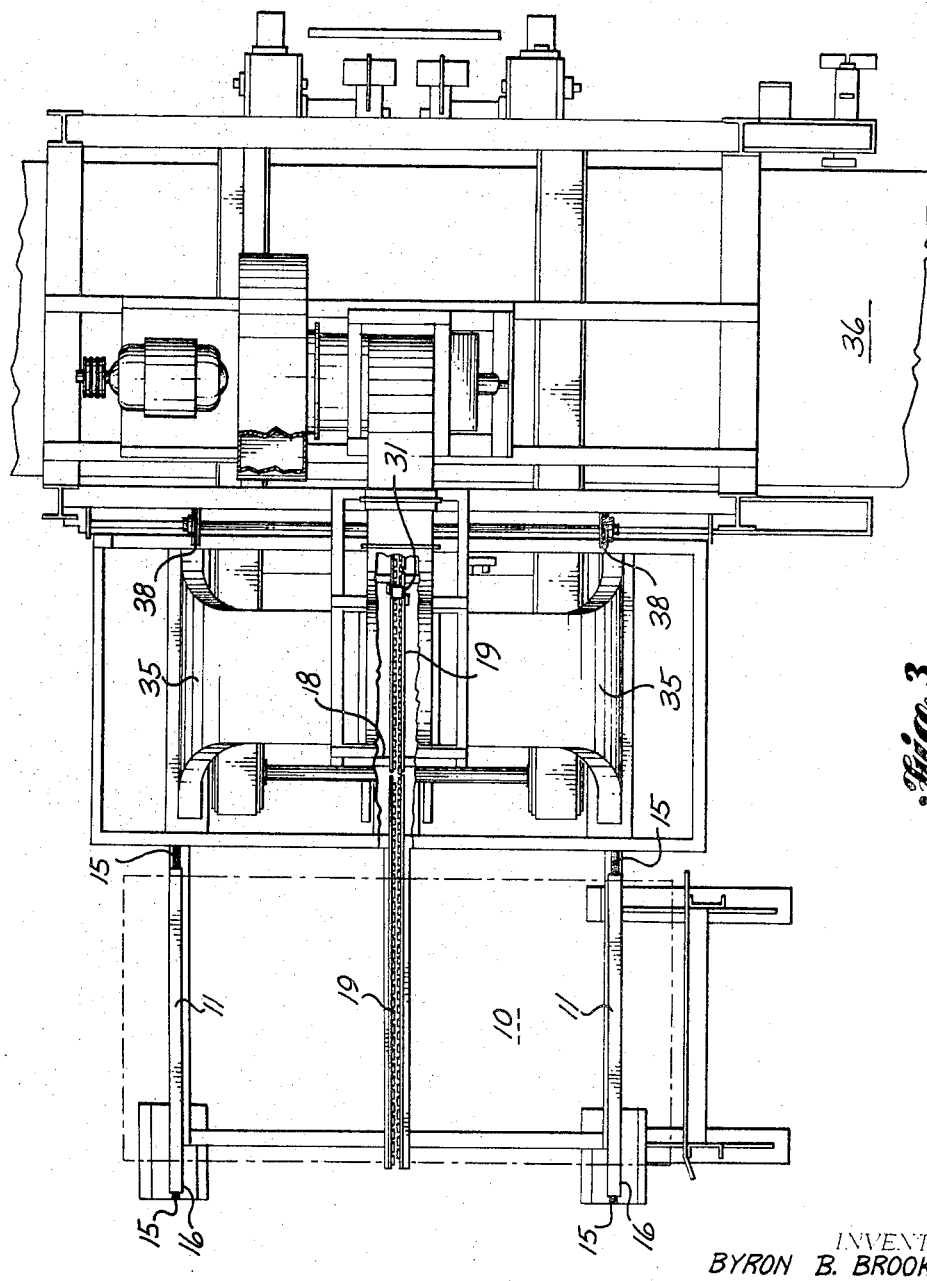

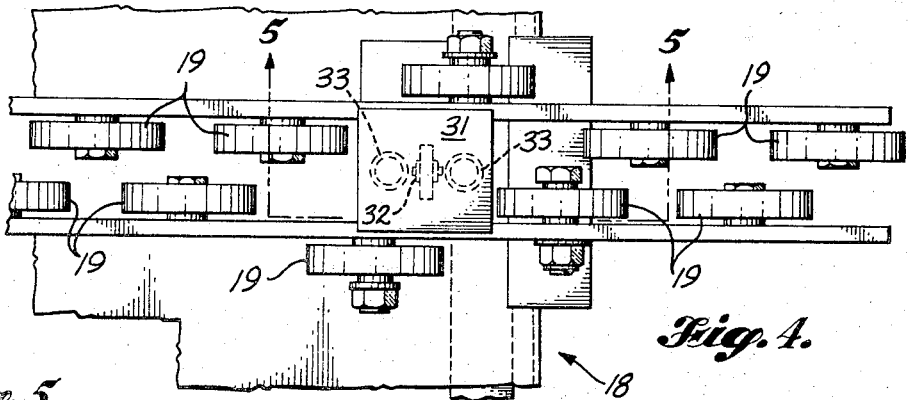
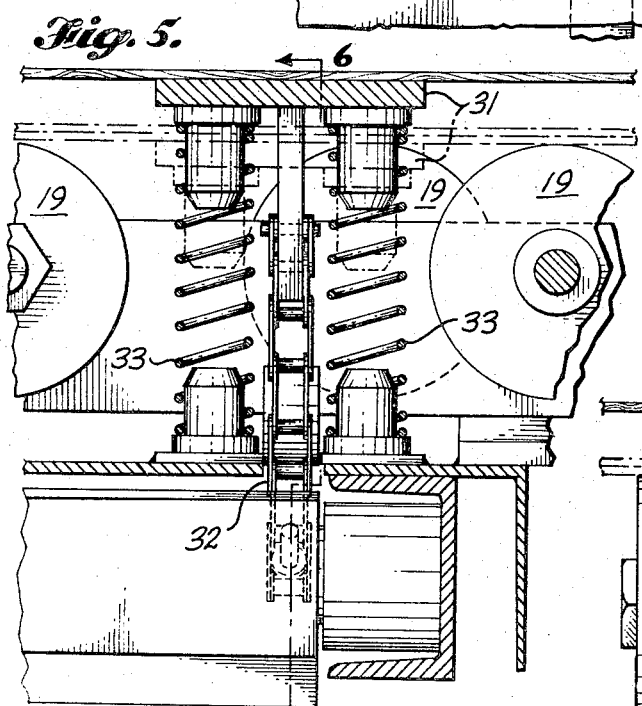
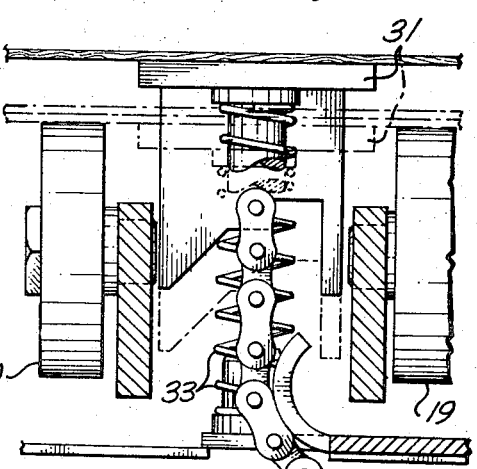
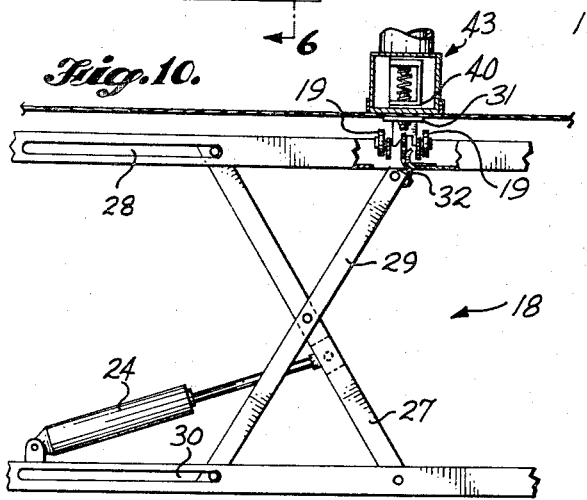
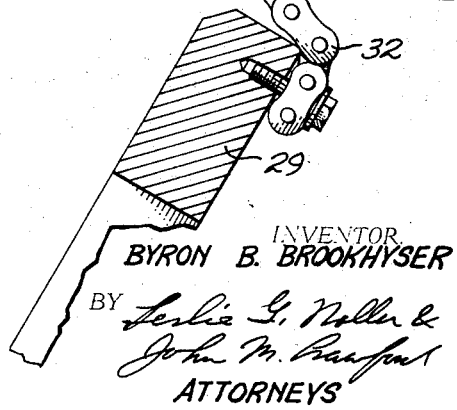

BY
ATTORNEYS

United States Patent Office 3,404,790
Patented Oct. 8, 1968

3,404,790
SUPPLY STATION
Byron B. Brookhyser, Milton, Wash., assignor to Weyerhaeuser Company, Tacoma, Wash., a corporation of Washington
Filed Nov. 2, 1966, Ser. No. 591,612
5 Claims. (Cl. 214—8.5)

ABSTRACT OF THE DISCLOSURE

This application relates to a device for unstacking individual sheets from a stack of sheets. Means are provided to move a stack of sheets to the unstacking position where the topmost individual sheet is removed from the stack by a suction gripper which moves the sheet in a transverse direction and deposits it at a point remote from the unstacking position. As individual sheets are removed from the top of the stack, elevating means move the stack upwardly to maintain the top sheet of the stack in a constant position. The suction gripper has a means which detects the stack moving means through the last sheet and immediately causes the stack moving means to be moved into position to receive another sheet.

---

This application relates to an apparatus for quickly placing material in position to be delivered to a machine, and specifically relates to an apparatus for placing veneer in position to be supplied to a plywood lay-up machine.

In the process of automatically laying-up veneer sheets and core strips into a plywood sheet, a sheet is placed on a conveyor, glue is applied to the sheet, core stock is placed over the glued face of the sheet, additional adhesive is placed on the core stock, and another sheet is placed on the glued core stock. Alternating layers of core stock and veneer sheets may be placed on the assembly. The number will depend on the number of plies in the sheet. A three-ply plywood panel comprises a face sheet, core stock and a back sheet. A five-ply plywood panel comprises a face sheet, core stock, a center sheet, core stock and a back sheet. A seven-ply plywood panel would have an additional layer of core stock and an additional center sheet.

Along the conveyor are stations for placing each of the veneer sheets and the core stock on the conveyor in sequence. At normal operating speeds, each of the stations will supply a veneer sheet or core stock approximately every eight seconds.

The veneer sheets are supplied from a pile of approximately 200 veneer sheets. It is necessary to replenish this supply during the eight second veneer sheet transfer cycle. It is an object of this invention to provide an apparatus which will accomplish this.

This and other objects will become readily apparent upon reading the following specification in conjunction with the attached drawings.

FIGURE 1 is a side elevational view of the apparatus with the elevator in down position ready to receive a stack of veneers.

FIGURE 2 is a side elevational view of the apparatus with the elevator in up position supporting a stack of veneers.

FIGURE 3 is a top plan view of the apparatus with portions cut away to show details of construction.

FIGURE 4 is a top plan view of the sensing plate and associated structure.

FIGURE 5 is a side elevational view of the sensing plate taken along line 5—5 of FIGURE 4. Portions are shown in skeletal outline to show the two positions of the plate.

FIGURE 6 is an end elevational view of the apparatus taken along line 6—6 of FIGURE 5.

FIGURE 10 is a side elevational view of the apparatus showing the relationship of the sensing elements.

Figure 7:
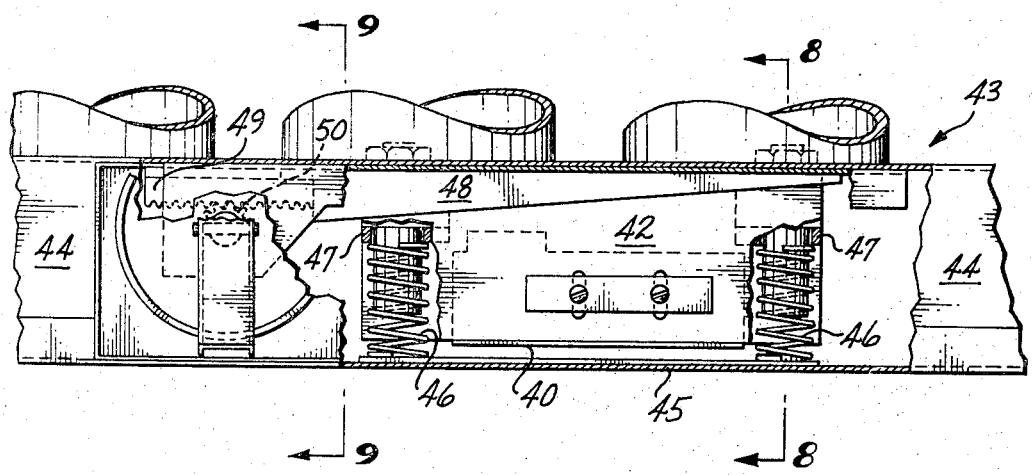
FIGURE 7 is a side elevational view of the proximity switch with portions cut away to show details of construction.
Figure 8:
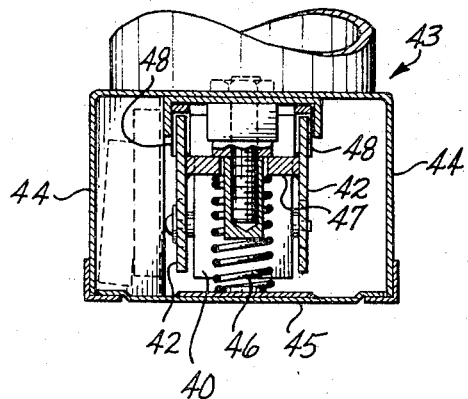
FIGURE 8 is a cross sectional view taken along line 8—8 of FIGURE 7.
Figure 9:
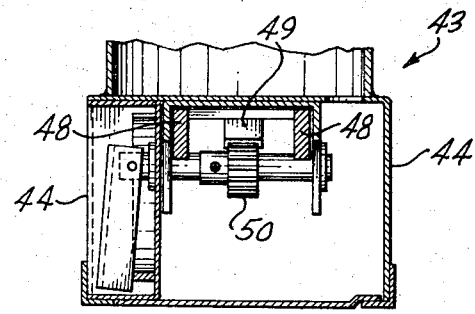
FIGURE 9 is a cross sectional view taken along line 9—9 of FIGURE 7.

As shown in FIGURE 1, the stack of veneers 10 rests on a pair of transfer members 11 of the transfer conveyor 12. Each of the transfer members 11 slides on a track 13 and is reciprocated by a cylinder 14 which is attached to the members 11 by a chain 15. The chain trains around the outer and inner pulleys 16 and 17 respectively. The transfer members 11 are reciprocated between an outer position in which they receive the stack of veneers and an inner position in which they carry the veneers over an elevator 18. The elevator 18 is between the tracks 13. Both the transfer conveyor 12 and the elevator 18 have central rollers 19 on which the veneer stack can ride as it is carried inwardly over the elevator.

Because of the speed required for the transfer, a backstop 20 is provided to stop forward travel of the stack 10 and align the individual veneers in the stack. The transfer members 11 travel inwardly of the outer face of the backstop in order to insure contact between the backstop and the stack 10.

The completion forward travel of the transfer members 11 is indicated by a limit switch 21. The limit switch is actuated by the contact 22 of the rod 23 of the cylinder 14. At the full inner position of the members 11, the rod 23 is fully extended, causing the contact 22 to actuate the switch 21.

The limit switch 21 actuates the cylinder 24 on the elevator 18, causing the elevator to move upwardly until the top of the veneer stack 10 is at a predetermined height. The vertical vacuum transfer mechanism 34 must be in its lowermost position before the elevator can move upwardly. A limit switch 25 in the mechanism 34 detects the height of the top of the veneer stack 10 and stops the upward movement of the elevator 18 by closing the valve on the cylinder 24. The vacuum transfer mechanism 34 removes individual veneers from the stack 10 lowering the height of the top of the stack. Eventually, the limit switch 25 is not tripped by the top of the stack when the mechanism 34 is in its lowermost position. The valve on the cylinder 24 remains open and the elevator moves upwardly until the top of the stack 10 trips the limit switch 25.

The upward travel of the elevator releases limit switch 26 reversing the flow to cylinder 14 which returns the transfer members to their outer position.

There are two conventional methods of attaching the cylinder 24 to the scissors lift elevator in order to raise and lower the elevator. In both methods, one end of the cylinder 24 is pivotally attached to the base of the elevator, the legs 27 are slidably mounted in the elevator body at 28 and the legs 29 are slidably mounted in the elevator base at 30. In the first system, the cylinder 24 is pivotally attached at its other end to the legs 27 and movement of the piston in the cylinder pivots the legs 27 inwardly or outwardly causing the elevator to lower or raise. In the other system a cam follower is mounted on the other end of the cylinder and a cam surface is placed in the elevator base. This system is shown in U.S. Patent No. 3,233,891 which issued Feb. 8, 1966.

The upward travel of the elevator allows the upwardly biased plate 31, situated centrally of the conveyor amid the rollers 19, to push upwardly against the veneer stack.

The positioning of the plate 31 is determined by the chain 32 which is attached to it and to the lower face of one of the legs 29 of the scissors lift and by the springs 33. The pivoting action of the leg in the upward travel of the elevator creates slack in the chain 32 which allows the plate 31 to be pushed upwardly by the springs 33 until the plate is above the rollers 19. The pivoting action of the leg in the downward travel of the elevator pulls the chain 32 downwardly, pulling the plate downwardly beneath the rollers 19.

When the pile 10 is in its uppermost position, the vertical vacuum transfer mechanism 34, which is in its lowermost position, contacts the top veneer sheet. The vertical vacuum transfer system lifts a veneer sheet from the pile and delivers it to a horizontal vacuum transfer mechanism 35. This latter mechanism carries the veneer sheet from over the pile to a position over the conveyor 36. At the proper time, the veneer sheet is guided from the vacuum transfer mechanism 35 onto the conveyor 36.

In operation, the vertical vacuum transfer mechanism 34 rests on the stack of veneers until the horizontal vacuum transfer mechanism 35 is in a position over the stack and in alignment with the path of travel of the vertical vacuum transfer system 34. When the horizontal vacuum transfer system 35 is in position, it trips a limit switch causing the vertical vacuum transfer mechanism 34 to rise, carrying the top veneer sheet upwardly with it. As the vertical vacuum transfer mechanism 34 rises above the horizontal vacuum transfer mechanism 35, it transfers the sheet to the horizontal vacuum transfer mechanism 35. When the vertical vacuum transfer mechanism 34 reaches its upper limit of travel, it trips a limit switch 38 causing the horizontal vacuum transfer mechanism 35 to move to a position over the conveyor 36. When the horizontal vacuum transfer mechanism reaches a position over the conveyor, it trips a limit switch 39 causing the vertical mechanism 34 to move downwardly into contact with the upper sheet in the stack 10 again. The sheet is held over the conveyor 36 until it is aligned with a sheet position on the conveyor. It is then guided onto the sheet position on the conveyor.

The cyclic operation continues until there is but one veneer sheet left in the stack 10. At this time, the weight on the plate 31 is less than the upward biasing pressure of the spring 33 on the plate, causing the plate 31 to rise above the rollers 19.

A proximity switch 40 is situated within the vacuum head 41 of the vertical vacuum transfer mechanism 34. The switch 40 is in alignment with the plate 31 and the distance between the switch 40 and the outer edge of the vacuum head 41 is such that the switch 40 will be tripped by the plate 31 as soon as the distance between the plate 31 and the outer edge of the vacuum head 41 is approximately equal to the thickness of a veneer. To accommodate variations in thickness, the switch 40 will trip when the distance between the plate 31 and the outer edge of the vacuum head 41 is between 1 and 2 thicknesses of veneer. A proximity switch usually operates on a magnetic principle. The switch has a magnet which is attracted to a magnetic material when the material is within a certain distance of the magnet. The magnet is moved by the material and this movement opens or closes a contact within the switch. The action requires that plate 31 be of a magnetic material.

Actuation of the switch 40 opens the valve to release the pressure on cylinder 24, causing the elevator 18 to drop immediately to its lowermost position while the last veneer sheet is being held by the vacuum head 41. As was stated above, the dropping of the elevator pulls the chain 32 downwardly so that the upper face of the plate 31 is below the level of the rollers 19. In its lowermost position, the elevator 18 trips a limit switch which actuates the cylinder 14 operating the transfer members 11 to move another stack of veneers onto the elevator and restart the cycle.

The proximity switch 40 is adjustable upwardly or downwardly to accommodate various thicknesses of veneer. This adjustment may be done in any manner. In the device shown, the switch 40 is mounted on a pair of side plates 42 within the housing 43. The housing has an outer frame 44 and a lower contact plate 45. Springs 46 extend between the plate 45 and the bars 47 which extend between the side plates 42. The springs bias the plate 45 downwardly and the side plates 42 upwardly. The side plates 42 may be moved toward or away from the contact plate 45 by a wedge 48 which contacts the upper edge of each of the side plates 42. The wedge may be moved forwardly or backwardly, lowering or raising the side plates, by the rack 49 and pinion gear 50.

Although certain specific embodiments of the apparatus have been described above, it will be apparent that many changes and modifications may be made in the apparatus within departing from the spirit of the invention. It should therefore be understood that the apparatus described above is intended to be illustrative only and is not intended to limit the scope of the invention.

What is claimed is:

1. A veneer supply station comprising
   a first outer veneer stack position, and
   a second inner veneer stack position;
   first means for moving a veneer stack from said first position to said second position;
   second means at said second position for stopping said stack in position;
   third means at said second position actuated by said first means for raising said stack;
   fourth means actuated by said stack for stopping said third means;
   fifth means above said second position for removing veneers from said stack, said fifth means including means for holding the last veneer in said stack at said second position;
   sixth means associated with said fifth means for detecting said third means through said last veneer means;
   seventh means, actuated by said sixth means upon detection of said third means, for lowering said third means;
   eighth means actuated by said third means when said third means is in its lowermost position to actuate said first means to move a stack from said first to said second position.

2. The apparatus of claim 1 in which said sixth means is a proximity switch and said third means has an upwardly biased steel plate in alignment with said proximity switch.

3. The article of claim 2 in which said proximity switch is mounted for travel in a vertical direction.

4. The article of claim 3 in which said third means is an elevator.

5. The article of claim 4 in which said fifth means is an overhead vacuum transfer assembly.

References Cited

UNITED STATES PATENTS

| | | | |
|---|---|---|---|
| 2,217,983 | 10/1940 | Hopkins | 214—8.5 |
| 2,921,788 | 1/1960 | Lawrence | 214—8.5 |
| 3,067,885 | 12/1962 | Kohler | 214—8.5 |

HUGO O. SCHULZ, *Primary Examiner.*

G. F. ABRAHAM, *Assistant Examiner.*